J. Richardson,
Harvester Rake.

No. 14,713 Reissued May 12, 1863.

UNITED STATES PATENT OFFICE.

WALTER A. WOOD, OF HOOSICK FALLS, NEW YORK, ASSIGNEE OF JOHN RICHARDSON.

IMPROVEMENT IN RAKES FOR HARVESTERS.

Specification forming part of Letters Patent No. 13,102, dated June 19, 1855; Reissue No. 1,472, dated May 12, 1863.

*To all whom it may concern:*

Be it known that JOHN RICHARDSON, of Buckeystown, in the county of Frederick and State of Maryland, did invent certain new and useful Improvements in Self-Operating Rakes for Harvesting-Machines; and I do hereby declare that the following is a full, clear, and exact description thereof, reference being had to the accompanying drawings, making a part of this specification, in which—

Figure 1:
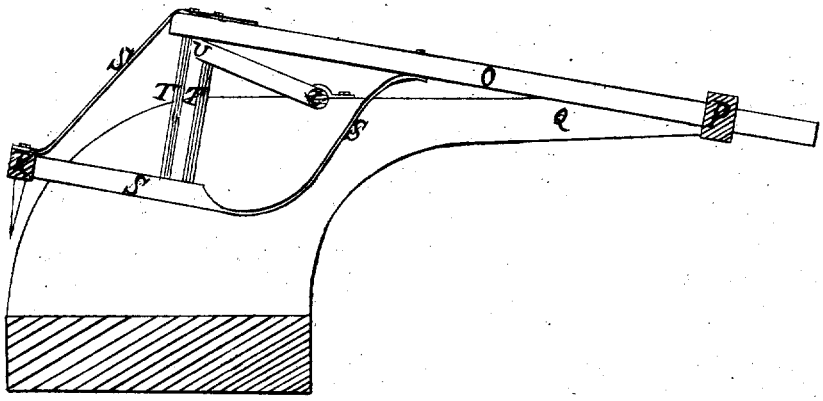
Figure 2:
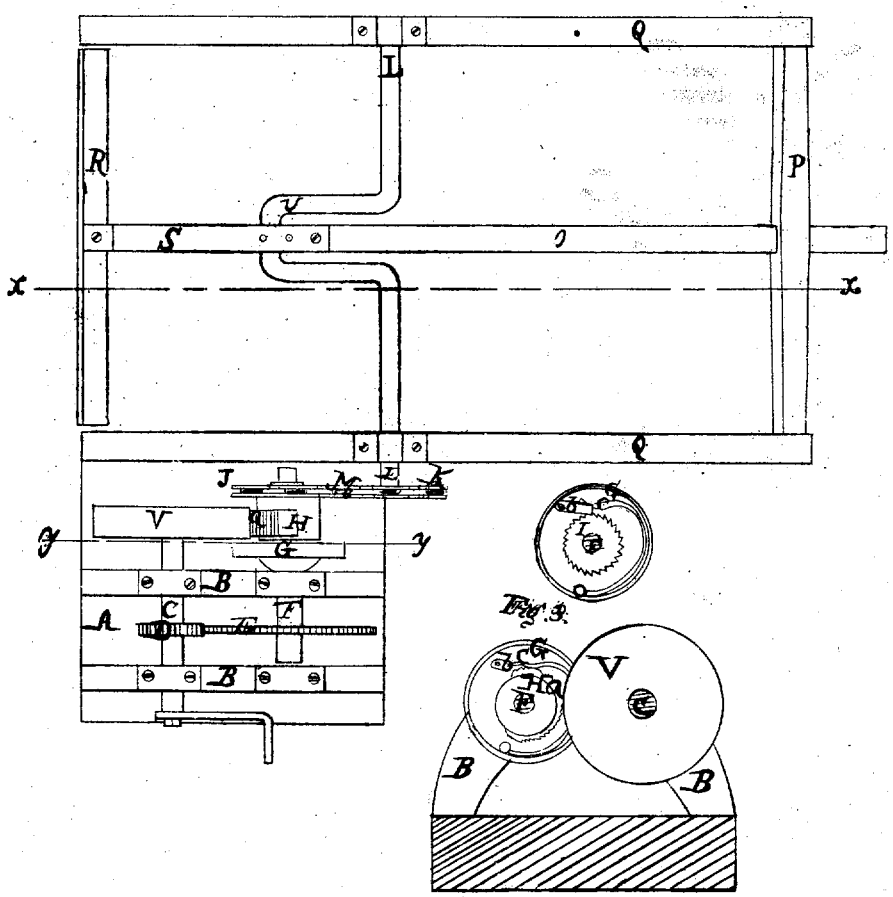

Figure 1 represents a vertical section taken at the red line *x x* of Fig. 2. Fig. 2 represents a top plan of the rake and the gear by which it is operated, and Fig. 3 represents a sectional elevation of portions of the gearing.

I am aware that rakes for harvesting-machines have been moved over the grain table or platform by means of a crank or cranks; but this does not give the rake its necessary steady and certain action.

This invention consists in giving to a self-acting rake its sweeping motion over the grain table or platform, for the purpose of clearing it of the cut grain that falls upon it, by the combined action of a crank or cranks and a rake-stale guided by and moving in a rolling or rocking piece that will admit of its reaching movement and at the same time steady and guide the rake in its movements.

To enable others skilled in the art to make and use this invention, I will proceed to describe the same with reference to the drawings.

The crank A may be driven from the main drive-wheel by any suitable gearing interposed between it and the drive-wheel, and the rake B is connected to this crank, so that it shall have its sweeping motion over the platform C as well as its rising-and-falling motion at the ends of its sweep, for the purpose of delivering the gavels at one point and to return in a raised-up position for the next succeeding similar operation.

The rake B has connected to it a long rake-stale, D, which passes through a turning or rocking guide, E, for the purpose of steadying it and to enable it to accomplish its sweeping motion without binding or cramping it, and thus by means of the crank A, rake-stale D, and turning or rocking guide E the rake receives all its necessary movements for clearing the platform of the cut grain and for delivering the gavel in a compact form on the ground, and is moreover guided, controlled, and held to its work by these devices.

As the rake is moved over the platform by the crank or crank-motion of the shaft the rake-stale passes through the guide E, and as the guide is swiveled or can turn or rock on its bearings it does so, to accommodate itself to the several positions of the rake during its sweeping or platform-clearing movements.

Having thus fully described the nature, object, and purpose of this invention, what is claimed therein as new, and desired to be secured by Letters Patent, is—

In combination, with a self-acting rake for harvesting-machines, the crank-motion, the turning or rocking guide, and the long rake-stale passing through said guide, substantially as and for the purpose described.

WALTER A. WOOD.

Witnesses:

JAMES S. THAYER,
ARTIN THAYER, Jr.